United States Patent [19]
Kozlowski

[11] Patent Number: 5,643,091
[45] Date of Patent: Jul. 1, 1997

[54] STROKING CONSTANT VELOCITY UNIVERSAL JOINT HAVING LOW STROKE LOAD

[75] Inventor: Keith Allen Kozlowski, Saginaw, Mich.

[73] Assignee: General Motors Corporation, Detroit, Mich.

[21] Appl. No.: 675,426

[22] Filed: Jun. 26, 1996

Related U.S. Application Data

[63] Continuation of Ser. No. 355,469, Dec. 14, 1994, abandoned.

[51] Int. Cl.⁶ .................................................. F16D 3/223
[52] U.S. Cl. ............................................ 464/144; 464/906
[58] Field of Search .................................. 464/142, 143, 464/144, 145, 906

[56] References Cited

U.S. PATENT DOCUMENTS

| | | |
|---|---|---|
| 2,838,919 | 6/1958 | Cull . |
| 3,370,441 | 2/1968 | Aucktor . |
| 3,475,924 | 11/1969 | Aucktor ................................. 464/144 |
| 3,553,979 | 1/1971 | Noguhi et al. . |
| 3,633,382 | 1/1972 | Westercamp ............................ 464/144 |
| 4,019,347 | 4/1977 | Krude . |
| 4,678,453 | 7/1987 | Acktor et al. ........................... 464/144 |

FOREIGN PATENT DOCUMENTS

| | | |
|---|---|---|
| 1251595 | 10/1967 | Germany . |
| 2419236 | 5/1975 | Germany . |
| 62-194028 | 8/1987 | Japan . |
| 3-172621 | 7/1991 | Japan ..................................... 464/144 |
| 972818 | 10/1964 | United Kingdom . |
| 2092267 | 8/1982 | United Kingdom ................... 464/144 |

Primary Examiner—Daniel P. Stodola
Assistant Examiner—Eileen A. Dunn
Attorney, Agent, or Firm—Saul Schwartz

[57] ABSTRACT

A crossed groove stroking constant velocity universal joint including inner and outer joint members having inner and outer ball grooves defining a plurality of crossed pairs and a plurality of spherical bearing balls seated in respective ones of the crossed pairs of inner and outer ball grooves with predetermined running clearance between the grooves and the bearing balls. The bearing balls are confined by the crossed pairs of ball grooves and by a ball cage between the inner and outer joint members to the homokinetic plane of the universal joint for constant velocity operation. Each of the outer ball grooves is circumferentially offset relative to the inner ball groove paired therewith by about the running clearance. Adjacent pairs of outer ball grooves are circumferentially offset in opposite directions relative to the inner ball grooves paired therewith. In a neutral mode of the universal joint corresponding to substantially zero torque transfer between the inner and outer joint members, the bearing balls only roll in the ball grooves to minimize stroke loads and consequent transfer of linear vibrations between the inner and outer joint members.

1 Claim, 2 Drawing Sheets

STROKING CONSTANT VELOCITY UNIVERSAL JOINT HAVING LOW STROKE LOAD

This is a continuation of application Ser. No. 08/355,469 filed on Dec. 14, 1994, now abandoned.

FIELD OF INVENTION

This invention relates to crossed groove stroking constant velocity universal joints.

BACKGROUND OF THE INVENTION

In motor vehicle front wheel drives, a drive axle is disposed between a transaxle on the sprung mass of the vehicle and a wheel spindle constituting part of the unsprung mass of the vehicle. An outboard, non-stroking constant velocity universal joint connects the drive axle to the wheel spindle. An inboard, stroking constant velocity universal joint connects the transaxle to the drive axle and strokes longitudinally and articulates angularly to accommodate suspension excursions of the wheel spindle relative to the transaxle. In some applications, the inboard joint is a crossed groove stroking constant velocity universal joint including a cylindrical inner joint member having a plurality of inner ball grooves, a cylindrical outer joint member having a plurality of outer ball grooves facing and crossed relative to the inner ball grooves, and a plurality of spherical bearing balls seated in respective pairs of the inner and outer ball grooves and confined thereby to the homokinetic plane of the universal joint for constant velocity operation. Commonly, such universal joints are constructed such that the widths of the ball grooves substantially equal the diameters of the bearing balls so that a mild interference fit is achieved between the bearing balls and corresponding crossed pairs of inner and outer ball grooves. Such mild interference fit between the bearing balls and ball grooves minimizes angular lash between the inner and outer joint members but also induces friction which resists stroking of the universal joint when the latter is in a neutral mode in which there is substantially zero torque transfer through the universal joint, e.g., when the motor vehicle is stopped with the engine on and the transaxle in a neutral range. In such neutral mode, linear vibrations transferred from the transaxle to the drive axle through the stroking universal joint because of the aforesaid induced friction may be transferred from the drive axle to the body through the nonstroking outboard universal joint and induce a noticeable shake in the body.

SUMMARY OF THE INVENTION

This invention is a new and improved crossed groove stroking constant velocity universal joint including a cylindrical inner joint member having a plurality of inner ball grooves, a cylindrical outer joint member having a plurality of outer ball grooves facing and crossed relative to the inner ball grooves, a floating ball cage between the inner and outer joint members, and a plurality of spherical bearing balls seated in respective crossed pairs of the inner and outer ball grooves with predetermined running clearance between the grooves and the bearing balls and in respective ones of a plurality of ball windows in the ball cage. The bearing balls are confined by the crossed grooves and the ball windows to the homokinetic plane of the universal joint for constant velocity operation. Adjacent pairs of outer ball grooves are circumferentially offset in opposite directions relative to the ones of the inner ball grooves paired therewith by about the aforesaid running clearance. Each bearing ball, therefore, contacts only one side of each of the corresponding inner and outer ball grooves when the universal joint is in the aforesaid neutral mode and rolls between the ball grooves in response to linear vibratory input to the universal joint to minimize the stroke load of the joint in its neutral mode and, consequently, the transfer of linear vibrations from the transaxle to the drive axle. When the universal joint transitions from the neutral mode to an active mode corresponding to torque transfer therethrough, the crossed relationship of the inner and outer ball grooves and the running clearance between the ball grooves and the bearing balls cooperate to permit the inner and outer joint members to rotate relative to each other until each bearing ball achieves a torque transferring position between its corresponding inner and outer ball grooves to maximize the torque carrying capability of the universal joint.

DESCRIPTION OF A PREFERRED EMBODIMENT

Figure 1:
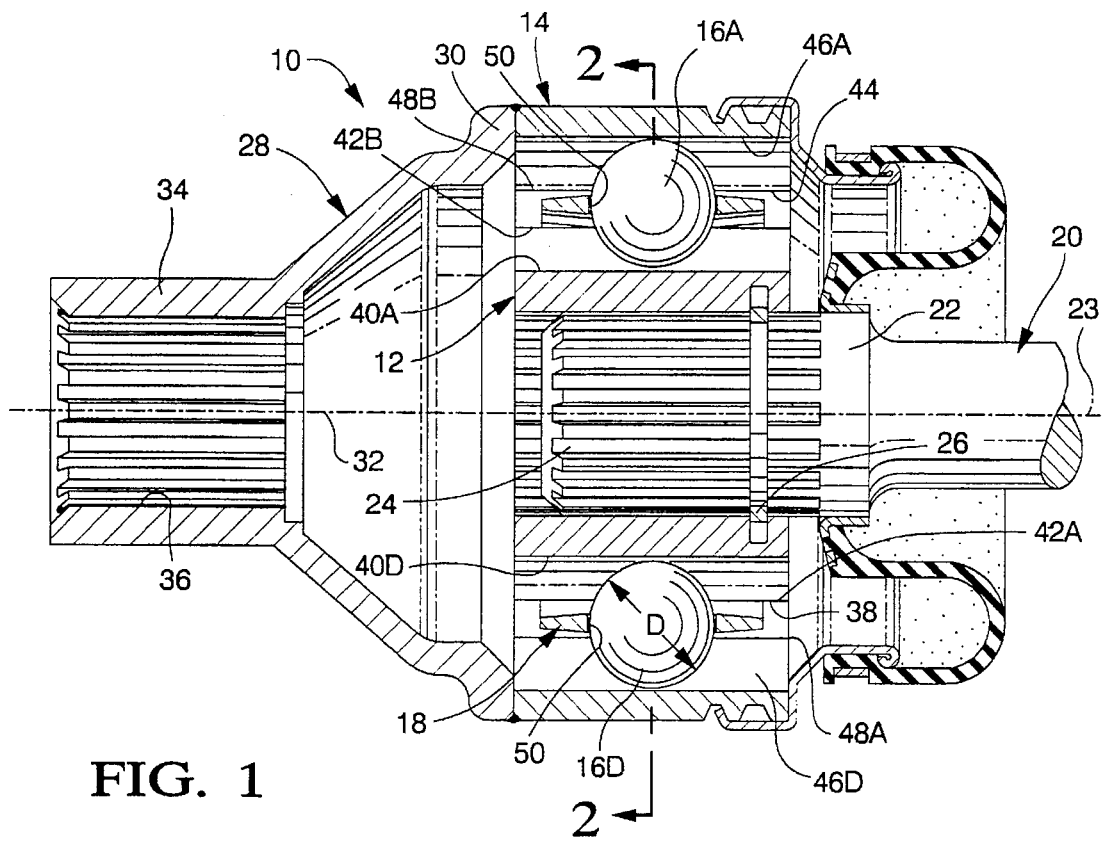
FIG. 1 is a longitudinal sectional view of a crossed groove stoking constant velocity universal joint according to this invention.

Referring to FIG. 1, a crossed groove stroking constant velocity universal joint 10 according to this invention includes a cylindrical inner joint member 12, a cylindrical outer joint member 14, a plurality of spherical bearing balls 16A–F, and a annular ball cage 18. A shaft 20, representative of a drive axle of a shaft of a motor vehicle front wheel drive, has an inboard end 22, an outboard end, not shown, and a centerline 23. The outboard end of the shaft is connected to a wheel spindle of the front wheel drive by a nonstroking constant velocity universal joint, not shown, for rotation and up and down suspension excursions with the wheel spindle. The inboard end 22 of the shaft 20 is rigidly connected to the inner joint member 12 by a spline connection 24 and a retaining ring 26 so that the centerline 23 of the shaft constitutes the centerline of the inner joint member. The inner joint member strokes in and out and articulates angularly as a unit with the shaft in response to suspension excursions of the wheel spindle.

A cup-shaped housing 28 of the universal joint 10 includes a wide end 30 in a plane perpendicular to a centerline 32 of the housing and a narrow tubular end 34 having a plurality of internal splines 36 parallel to the centerline 32. The wide end 30 butts against and is welded to a side of the outer joint member 14 whereby the centerline 32 of the housing 28 constitutes the centerline of the outer joint member and the two define a rigid unit. An output shaft, not shown, of a front wheel drive transaxle is rotatable about a fixed centerline coincident with the centerline 32 of the housing 28 and is connected to the latter through the splined tubular end 34 so that the housing 28 and the outer joint member 14 are rotatable about a fixed centerline represented by the centerline 32 of the housing. Retaining means, not shown, between the housing 28 and the transaxle output shaft prevent bodily movement of the housing and the outer joint member in the direction of the centerline 32 relative to the transaxle.

Figure 3:
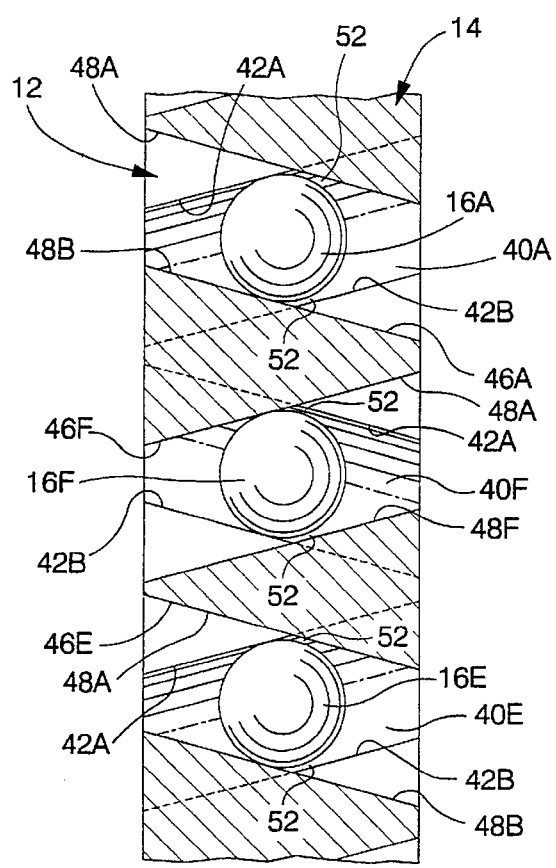
FIG. 3 is a planar representation of only the inner and outer joint members taken generally along curved lines 3—3 in FIG. 2.
Figure 2:
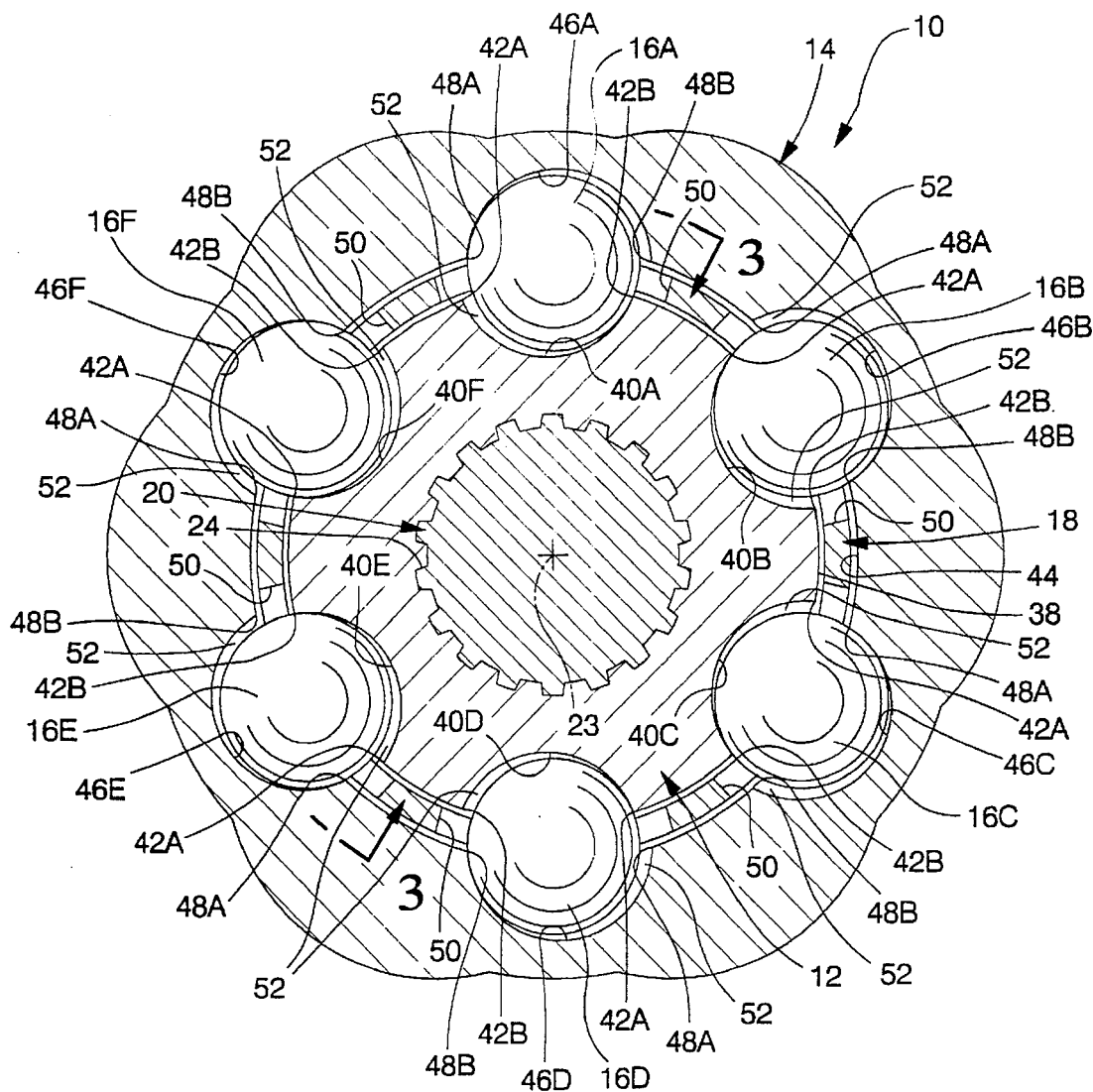
FIG. 2 is a sectional view taken generally along the plane indicated by lines 2—2 in FIG. 1.

Referring to FIGS. 2-3, the inner joint member 12 has a cylindrical outer surface 38 in which are formed a plurality of inner ball grooves 40A-F each having a pair of side edges 42A-B defined where the groove intersects the outer surface 38. The inner ball grooves in a first set thereof consisting of the grooves 40A, 40C, 40E have left hand leads. The inner ball grooves in a second set thereof consisting of the grooves 40B, 40D, 40F, alternated with the grooves 40A, 40C, 40E of the first set, have right hand leads equal to the left hand leads of the first set.

The outer joint member 14 has a cylindrical inner surface 44 in which are formed a plurality of outer ball grooves 46A-F each having a pair of side edges 48A-B defined where the groove intersects the inner surface 44. The outer ball grooves in a first set thereof consisting of the grooves 46A, 46C, 46E have right hand leads. The outer ball grooves in a second set thereof consisting of the grooves 46B, 46D, 46F, alternated with the grooves 46A, 46C, 46E of the first set, have left hand leads equal to the right hand leads of the first set.

The outer joint member 14 is oriented angularly relative to the inner joint member 12 such that a plurality of crossed pairs 40A-F, 46A-F, respectively, of inner and outer ball grooves are defined between the inner and outer joint members. The spherical bearing balls 16A-F are seated in the crossed pairs 40A-F, 46A-F of inner and outer ball grooves, respectively, where the grooves cross and in corresponding ones of a plurality of windows 50 in the ball cage 18. Each of the bearing balls has a diameter "D", FIG. 1.

As seen best in FIGS. 2-3, the widths of the inner and outer ball grooves 40A-F, 46A-F between the edges 42A-B, 48A-B thereof exceed the diameter "D" of the corresponding bearing ball 16A-F by a predetermined running clearance 52 illustrated in exaggerated fashion in FIGS. 2-3. As viewed in the homokinetic plane of the universal joint, FIG. 2, adjacent pairs of outer ball grooves 46A-B, 46C-D, 46E-F are circumferentially offset relative to the facing inner ball grooves paired therewith in opposite directions by about the amount of the running clearance 52 so that, in a neutral mode of the universal joint 10 corresponding to substantially zero torque transfer between the outer joint member 14 and the inner joint member 12, each bearing ball engages only one side of each of the ball grooves and all of the running clearance is concentrated on the opposite side of the bearing ball from the point of engagement with the ball groove. For example, the outer ball grooves 46A-B are circumferentially offset in opposite directions relative to the inner ball grooves 40A-B. The bearing ball 16A engages the outer ball groove 46A adjacent the side edge 48A thereof and the inner ball groove 40A adjacent the side edge 42B thereof diagonally opposite side edge 48A of the outer ball groove. Conversely, the bearing ball 16B engages the outer ball groove 46B adjacent the side edge 48B thereof and the inner ball groove 40B adjacent the side edge 42A thereof diagonally opposite side edge 48B of the outer ball groove.

The effect of the alternating circumferential offset of adjacent pairs of crossed inner and outer ball grooves as described above is that, in the neutral mode of the universal joint 10, the bearing balls 16A-F only roll in the inner and outer ball grooves 40A-F, 46A-F in response to relative linear displacement between the inner and outer joint members 12, 14 in the direction of the centerline 32. Because the bearing balls roll instead of skid in the inner and outer ball grooves, the stroke load of the universal joint 10 in its neutral mode is less than corresponding stroke loads of the aforesaid prior stroking crossed groove constant velocity universal joints. Accordingly, the universal joint 10 according to this invention is less prone to transfer vibrations from the transaxle to the drive axle than the aforesaid prior universal joints.

In active modes of the universal joint 10, i.e., when torque is transferred between the inner and outer joint members 12, 14 through the bearing balls 16A-F, axial thrust between the inner and outer joint members induced by the crossed inner and outer ball grooves causes each of the bearing balls to become centered between its corresponding inner and outer ball grooves in the homokinetic plane of the universal joint. Accordingly, regardless of the direction of applied torque, each of the bearing balls 16A-F transfers an equal fraction of the applied load between the inner and outer joint members so that the torque carrying capability of the universal joint 10 according to this invention is not compromised by the alternating circumferential offset of adjacent pairs of crossed inner and outer ball grooves as described above.

The embodiments of the invention in which an exclusive property or privilege is claimed are defined as follows:

1. A crossed groove stroking constant velocity universal joint comprising:

an inner joint member having a plurality of inner ball grooves of predetermined width oblique to a centerline of said universal joint in alternating ones of a right hand lead direction and a left hand lead direction, an outer joint member having a plurality of outer ball grooves of said predetermined width oblique to said centerline of said universal joint in alternating ones of a right hand lead direction and a left hand lead direction, said right hand lead outer ball grooves facing and cooperating with said left hand lead inner ball grooves in defining a first plurality of crossed pairs of inner and outer ball grooves and said left hand lead outer ball grooves facing and cooperating with said right hand lead inner ball grooves in defining a second plurality of crossed pairs of inner and outer ball grooves, an annular ball cage between said inner and said outer joint members having a plurality of ball windows therein, and a plurality of spherical bearing balls seated in respective ones of said first plurality and said second plurality of crossed pairs of inner and outer ball grooves and in respective ones of said ball windows so that said bearing balls are confined to the homokinetic plane of said universal joint for constant velocity operation, each of said bearing balls having a diameter less than said predetermined width of said inner and said outer ball grooves so that a predetermined running clearance is defined between each of said bearing balls and said inner and said outer ball grooves of the corresponding crossed pair, and adjacent ones of said right hand lead and said left hand lead outer ball grooves being circumferentially offset in opposite directions from said left hand lead and said right hand lead inner ball grooves paired therewith when viewed in the homokinetic plane of said universal joint by an mount substantially equal to said predetermined running clearance so that in a neutral mode of said universal joint corresponding to substantially zero torque transfer between said inner joint member and said outer joint member, each of said bearing balls rolls only against one side of each of said inner and said outer ball grooves of the corresponding crossed pair.

* * * * *